UNITED STATES PATENT OFFICE.

ISAAC ADAMS, JR., OF BOSTON, MASSACHUSETTS, ASSIGNOR TO THE UNITED NICKEL COMPANY, OF NEW YORK CITY.

IMPROVEMENT IN COATING METALS WITH METAL.

Specification forming part of Letters Patent No. 57,271, dated August 21, 1866; reissue No. 6,313, dated March 2, 1875; reissue No. 6,402, dated April 27, 1875; application filed April 16, 1875.

*To all whom it may concern:*

Be it known that I, ISAAC ADAMS, Jr., of Boston, county of Suffolk and State of Massachusetts, have invented certain Improvements in Coating Metals with Metal; and I do hereby declare that the following is a description of my invention sufficient to enable those skilled in the art to practice it.

This invention relates to surfacing metal articles which are to be subjected to flame, and which, by the action of such flame, are easily corroded, with a coating or deposit of anti-corrosive metal, which will practically prevent the oxidizing action of heat and flame.

The principal object of my invention is the protection of gas tips or burners from oxidation.

It is well known that the action of the flame upon common gas-burners soon impairs their orifices by oxidation and the deposit of oxide upon the surfaces against which the flame acts, and I have practically demonstrated that, by coating such surfaces with a thin deposit of nickel, the heat and flame have no detrimental effect upon the tips, the orifice being kept entirely free from deposit of oxide, causing the flame to burn with undiminished luster. Other metallic articles subjected to about the same degree of heat—such as common fluid-lamp burners, &c.—may be thus treated with similar beneficial results. My invention consists, therefore, in coating or surfacing gas-tips and other similar articles with a deposit of nickel, to render them anti-corrosive by heat, or in such articles so coated.

From the cheapness and ease of application of nickel by electroplating or otherwise, and the protection which the coating imparts, it will be obvious that this invention is of great practical utility.

The corrosion of the surfaces of metal articles is also effected by moisture of the atmosphere; but the coating of nickel is a practical protection against corrosion, whether induced by heat or by moisture, or by both.

I claim—

Rendering gas-tips and other similar articles anti-corrosive to heat or moisture by surfacing them with nickel, substantially as set forth.

ISAAC ADAMS, JR.

Witnesses:

CHAS. A. BEAMAN, Jr.,

FRANCIS W. HURD.